Jan. 25, 1927.

C. ELLIS 1,615,262

MANICURE IMPLEMENT

Filed April 3, 1926

Claudia Ellis
INVENTOR

Patented Jan. 25, 1927.

1,615,262

UNITED STATES PATENT OFFICE.

CLAUDIA ELLIS, OF JAMAICA, NEW YORK.

MANICURE IMPLEMENT.

Application filed April 3, 1926. Serial No. 99,620.

The object is the provision of a manicure implement in which the handle member thereof has removably attached to the ends thereof manicuring implements of hard preferably sanded rubber so that these implements may be readily removed when worn or when desired.

A still further object is the provision in an implement of this type, of a handle having one of its ends provided with a reduced extension to be received in the socket of a manicuring implement, its second end being bifurcated to receive therein a second manicuring implement, the last mentioned implement being notched, to contact with the opposite sides and faces of the handle, while means is provided for holding the implement in the said bifurcated end of the handle so that the said implement may be manipulated without liability of displacement with respect to the handle.

To the attainment of the foregoing the invention consists in the improvement as hereinafter described and definitely claimed.

Figure 1:
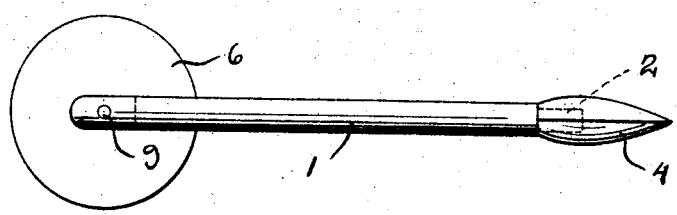
Figure 1 is a side elevation of an implement in accordance with this invention.
Figure 2:
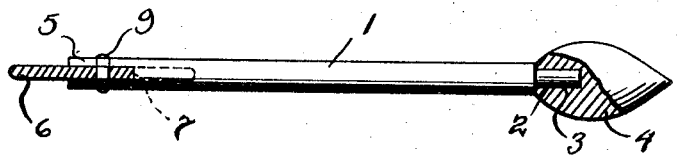
Figure 2 is a view looking at right angles with respect to the showing of Figure 1, parts being in section.
Figure 3:
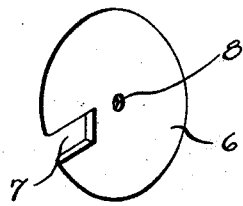
Figure 3 is a perspective view of the burnishing and polishing disc.

From experience I have found that by constructing manicure implements of hard rubber of a consistency equaling that of an ordinary ink eraser, and which is slightly impregnated with sand, that the same will operate to clean the finger nails and remove dead cuticle without bruising the flesh, in a better manner than the orange-wood stick which is now generally employed. Also I have found that it is more convenient and economical to provide a handle member to which these implements may be removably attached, so that any desired number of such implements may be employed with the same handle and likewise whereby new implements may be substituted for worn implements.

Referring now to the drawings the numeral 1 designates the handle of my improvement. This handle may be formed of any desired material and may be round in cross section. One end of the handle is provided with a reduced extension 2 and this extension is designed to be received in an opening or socket 3 in a pointed implement 4. The pointed implement is made of hard rubber or like suitable material, and this implement is employed for removing dirt from under the finger nails and likewise for removing cuticle.

The second end of the handle 1 is bifurcated to provide parallel spaced arms 5, the said arms having aligning openings therethrough.

These arms are designed to receive therebetween a burnishing and polishing disc 6 of the same material as the implement 4. This disc is notched from its periphery, as at 7, and is centrally provided with an opening 8. The opposite walls provided by the notch 7, are adapted to contact with the opposite sides or faces of the handle 1 and when in such position the opening 8 is brought to register with the openings in the arms 5. There is then passed through these aligning openings a removable holding element 9. When the disc 6 is thus arranged on the handle it is held from movement in any direction so that the manicurist can accurately manipulate the disc during the burnishing and polishing operation. Preferably the disc has a rounded edge so that the same may be also employed for removing cuticle, etc.

The simplicity of my construction and its advantages will, it is believed, be perfectly apparent to those skilled in the art to which such invention relates when the foregoing description has been read in connection with the accompanying drawings.

What I claim is:—

A manicuring implement, including a handle having a reduced extension at one of its ends and its opposite end bifurcated to provide parallel arms that have aligning openings therethrough, a pointed hard rubber implement having a socket to receive the reduced end of the handle therein, and to frictionally engage therewith, a burnishing and polishing disc adapted to be received in the bifurcated portion of the handle, said disc having a peripheral notch and a central opening therethrough, the opposite walls of the notch adapted to contact with the opposite sides or faces of the handle and the openings in the arms and a holding element passing through the aligning openings.

In testimony whereof I affix my signature.

CLAUDIA ELLIS.